(12) United States Patent
Lin et al.

(10) Patent No.: US 6,274,676 B1
(45) Date of Patent: Aug. 14, 2001

(54) TIRE COMPONENTS HAVING IMPROVED TEAR STRENGTH

(75) Inventors: Chen-Chy Lin, Hudson; Hamada Tatsuro, Copley, both of OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/227,121

(22) Filed: Jan. 8, 1999

(51) Int. Cl.$^7$ .................................................. C08L 9/00
(52) U.S. Cl. .................... 525/240; 525/232; 525/194; 525/198; 525/89; 525/99
(58) Field of Search .................... 525/240, 232, 525/194, 198, 89, 99

(56) References Cited

U.S. PATENT DOCUMENTS

| | | | |
|---|---|---|---|
| 4,128,523 | * 12/1978 | Britton et al. | 260/33.6 |
| 4,299,931 | 11/1981 | Coran et al. | 525/95 |
| 4,350,795 | * 9/1982 | Bohm et al. | 525/194 |
| 4,675,349 | 6/1987 | Palombo et al. | 523/351 |
| 4,739,005 | 4/1988 | Araki et al. | 524/496 |
| 4,883,837 | 11/1989 | Zabrocki | 525/66 |
| 5,292,590 | 3/1994 | Lin et al. | 428/494 |
| 5,341,863 | 8/1994 | Sandstrom et al. | 152/209 |
| 6,037,419 | 3/2000 | Mukai et al. | 525/242 |

FOREIGN PATENT DOCUMENTS

| | | |
|---|---|---|
| 0 445 486 A2 | 12/1990 | (EP) . |
| 1092174 | 11/1967 | (GB) . |

OTHER PUBLICATIONS

"Improved Durability in OTR Mining Tires" by Walker et al., Katschuk–Gummi, Kunslatolle 38, Johrgang, Nr, Jun., 1985.

"Improving Cutting, Chipping Resistance of Tire Treads" by Engelhardt et al., ITEC '96 Select, pp. 12–19, 1996.

"The Anhydride content of Some Commercial PP–g–MA: FTIR and Titration" by Sclavons, Journal of Applied Polymer Science, vol. 62, pp. 1205–1210, 1996.

"Blends of Elastomers and Thermoplastics—A Review" by J.R. Dunn, Rubber Chemical Technology, vol. 49, pp. 978–991, 1976.

"Modification of Rubbers with Solid Polymers" by Zelenev et al., Sov. Rubber Tech. vol. 29, pp. 21–23, 1970.

"Associations Éolastomères–Plastomères Étude de Quelques Properiétés" by Blondel, Rev. Gen Caoutch Plast., vol. 44, No. 9, pp. 1011–1017, 1967.

"Properties of Tread Vulcanisates Containing Polyethylene and Copolymers of Ethylene with Other Monomers" by Tyurina et al., Sov. Rubber Tech., vol. 30, pp. 15–16, 1971.

"Features of the Change in the Properties of Rubber Mixes and Vulcanisates on the Addition of Plastics" by Tyurina et al., Sov. Rubber Tech. vol. 31, pp. 14–17, 1972.

"Properties of Carcass Vulcanisates for Radial–Ply Tyres" by Priklonskaya et al., Sov. Rubber Tech., vol. 28, pp. 11–13, 1969.

"OREVAC® Coextrusion Adhesives", Elf Atochem North America, Inc., Technical Brochure, Mar., 1997.

"Modification of Polyolefins with Maleic Anhydride" by André H. Hogt, COMPALLOY '90., pp. 181–193, 1990.

"The Maleic Anhydride Grafting of Polypropylene with Organic Peroxides" by Callais, COMPALLY '90, pp. 359–369.

EXXELOR, Exxelor PO 1015, Exxon Chemical, Technical Brochure, undated.

U.S. application No. 09/209,271, filed Dec. 11, 1998, pending.

U.S. application No. 09/227,927, filed Dec. 8, 1999, pending.

* cited by examiner

*Primary Examiner*—David W. Wu
*Assistant Examiner*—Ling-Siu Choi
(74) *Attorney, Agent, or Firm*—David G. Burleson; Arthur M. Reginelli

(57) ABSTRACT

A tire having improved tear strength including at least one component comprising a vulcanized elastomer; and up to about 35 parts by weight of polyolefin copolymer per one hundred parts by weight rubber.

20 Claims, No Drawings

TIRE COMPONENTS HAVING IMPROVED TEAR STRENGTH

TECHNICAL FIELD

This invention relates to improved rubber compositions. More particularly, this invention is directed toward rubber vulcanizates that demonstrate improved tear strength. Specifically, the rubber compositions and vulcanizates of this invention include at least one polyolefin copolymer as an additive to achieve the desired properties. The preferred embodiments of this invention are directed toward vulcanizable compositions of matter that are useful for fabricating tires.

BACKGROUND OF THE INVENTION

Off road or heavy truck tires are often subjected to rough road conditions that produce repetitive, localized high pressure pounding on the tire. These stresses can cause fatigue fracture and can lead to crack formation and growth. This degradation of the tire has also been referred to as chipping or chunking of the tread surface or base material.

In an attempt to prevent this degradation, it is known to add reinforcements such as carbon black, silicas, silica/silanes or short fibers to tire compositions. Silica has been found advantageous because of its ability to deflect and suppress cut prolongation, and silanes have been added to bind the silica to unsaturated elastomers. The fibers that have been added include nylon and aramid fibers.

It is also known that the addition of polyolefins to rubber compositions can provide several beneficial properties. For example, low molecular weight, high density polyethylene, and high molecular weight, low density polyethylene, are known to improve the tear strength of polybutadiene or natural rubber vulcanizates. In the tire art, it has also been found that polyethylene increases the green tear strength of carcass compounds and permits easy extrusion in calendering without scorch. Polypropylene likewise increases the green strength of butyl rubber. Polypropylene, has also been effective in raising the static and dynamic modulus of rubber, as well as the tear strength of the rubber.

Although the addition of polyolefins to rubber compositions is known to provide several beneficial effects, the addition of polyolefin to tire recipes has, heretofore, had a deleterious affect on the mechanical, wear, and hysteresis properties of tires, as well as handling and ride comfortability of the tires.

Accordingly, there remains a need in the art to improve the tear strength of rubber vulcanizates, especially those deriving from tire compositions, without sacrificing the other properties of vulcanizates, tire components, or tires.

SUMMARY OF INVENTION

It is therefore an object of the present invention to provide a tire component having increased tear strength, where the tire component is less susceptible to chipping and chunking, without substantially impacting the mechanical and wear properties of the tire component.

It is another object of the present invention to provide a tire component having increased tear strength, where the tire component is less susceptible to chipping or chunking, without substantially impacting the hysteresis properties of the tire component.

It is yet another object of the present invention to provide a vulcanizate having increased tear strength, where the vulcanizate is less susceptible to chipping and chunking, without substantially impacting the mechanical and wear properties of the vulcanizate.

It is still another object of the present invention to provide a vulcanizate having increased tear strength, where the vulcanizate is less susceptible to chipping or chunking, without substantially impacting the hysteresis properties of the vulcanizate.

It is also an object of the present invention to provide vulcanizable compositions of matter that will give rise to a cured product having increased tear strength, where the cured product is less susceptible to chipping and chunking, without substantially impacting the mechanical and wear properties of the cured product.

It is another object of the present invention to provide vulcanizable compositions of matter that will give rise to a cured product having increased tear strength, where the cured product is less susceptible to chipping or chunking, without substantially effecting the hysteresis properties of the cured product.

It is yet another object of the present invention to provide a tire having increased tear strength without substantially impacting the mechanical and wear properties of the tire at high temperatures.

It is still yet another object of the present invention to provide a vulcanizate having increased tear strength without substantially impacting the mechanical and wear properties of the vulcanizate after heat aging.

At least one or more of the foregoing objects, together with the advantages thereof over the known art relating to tire components and compositions for making the same, which shall become apparent from the specification that follows, are accomplished by the invention as hereinafter described and claimed.

In general the present invention provides a tire having improved tear strength including at least one component comprising a vulcanized elastomer; and up to about 35 parts by weight of polyolefin copolymer per one hundred parts by weight rubber.

The present invention also provides a vulcanizable composition of matter comprising an elastomer up to about 35 parts by weight of polyolefin copolymer per one hundred parts by weight rubber; and up to about 100 parts by weight.

The present invention further provides a vulcanizate prepared by a process comprising the steps of preparing a vulcanizable composition of matter that includes an elastomer and a polyolefin copolymer; and vulcanizing the composition of matter with at least one vulcanizing agent.

PREFERRED EMBODIMENT FOR CARRYING OUT THE INVENTION

It has now been found that the addition of polyolefin copolymers to vulcanizable compositions of matter that are useful for making tires provides for tires and tire components having increased tear strength without substantially affecting the mechanical, wear and hysteresis properties of the tire rubber. Notably, the mechanical properties of the tire components are not substantially degraded after heat aging by the addition of the polyolefin polymers. Accordingly, the present invention is directed toward vulcanizable compositions of matter, tire recipes, vulcanizates, tire components, and tires containing polyolefin copolymers. The practice of the present invention is especially useful in base stock recipes, but inasmuch as the increase in tear strength does not deleteriously impact the wear, mechanical, and hysteresis properties of the rubber, the practice of the present invention may also be applied to the tread and sidewall stocks of tires. Furthermore, it should be understood that the practice of the present invention is believed to be especially advantageous for off-road or heavy-duty truck tires, although it is believed that the practice of the present invention will improve other tires such as passenger tires.

The polyolefin copolymers that are useful in practicing this invention include random, block, and statistical copolymers of ethylene and propylene. For purposes of this specification, these copolymers of ethylene and propylene may simply be referred to as copolymers. Preferably, these copolymers will contain a major amount, i.e. more than 50% by weight, of polypropylene monomeric units. More preferably, the copolymers will contain from about 1 to 30 percent by weight polyethylene or ethylene monomeric units, with the remainder of the copolymer substantially including polypropylene or propylene monomeric units. Even more preferably, the copolymers will contain from about 5 to about 25 percent by weight ethylene monomeric units, and even more preferably from about 10 to about 20 percent by weight ethylene monomeric units, with the remainder of the copolymers substantially including propylene monomeric units. It should be understood that many of the commercially available copolymers that are useful in practicing this invention contain some amount of contamination or by-products of polymerization, and therefore the copolymers of this invention have been defined to include ethylene monomeric units with the remainder of the copolymers substantially including propylene monomeric units.

Although not required, it is also preferred that the copolymers employed in this invention contain some polyethylene crystals. For purposes of this specification, copolymers that contain some polyethylene crystals are those copolymers that, when analyzed by X-ray diffraction analysis, show peaks at $2\theta$ of about 21.64, which corresponds to the polyethylene crystal plane 110 or PE(110) and $2\theta$ at about 24.03, which corresponds to the polyethylene crystal plane 200 or PE(200), based upon orthorhombic polyethylene crystal unit cell.

The molecular weight of the copolymers that are useful in practicing the present invention can vary. Indeed, the molecular weights of commercially available copolymers vary. It is, however, preferred that the molecular weight of the copolymers that are employed in this invention be from about 80,000 to about 500,000, preferably from about 90,000 to about 400,000, and even more preferably from about 100,000 to about 350,000, as determined by using standard GPC analysis with polystyrene as a standard.

Many of the copolymers that are useful in practicing this invention are commercially available. For example, propylene-ethylene copolymers are available from Aristech Chemical Corporation of Pittsburgh, Pa. under the tradenames TI4119GN, TI15150M, TI4330F and TI15350M. These copolymers contain varying amount of ethylene units based upon the specific product purchased. In general, the amounts of ethylene units ranges from about 5 percent by weight to about 20 percent by weight, with the remainder of the copolymer substantially including propylene monomeric units. Copolymers that can be used in this invention can also be obtained from a variety of other commercial sources and the scope of the present invention should not be limited by the selection of any one specific commercially available copolymer.

According to the present invention, polyolefin copolymers are added to vulcanizable compositions of matter that are useful for fabricating tires. Generally, the polyolefin copolymers are added in an amount up to about 35 parts by weight per 100 parts by weight rubber (phr). Preferably, the polyolefin copolymers are added in an amount from about 5 to about 30 parts by weight (phr), more preferably from about 10 to about 25 parts by weight (phr), and even more preferably from about 15 to about 20 parts by weight (phr). It should be understood that more than one type of copolymer, i.e. a mixture of copolymers, can be added to vulcanizable compositions of matter according to this invention.

Although copolymers are added to vulcanizable compositions of matter that are useful for fabricating tires, practice of this invention does not alter the type or amount of other ingredients typically included within these vulcanizable compositions of matter. Accordingly, practice of this invention is not limited to any one particular vulcanizable composition of matter or tire compounding stock.

Typically, these vulcanizable compositions of matter include a rubber component that is blended with reinforcing fillers and at least one vulcanizing agent. These compositions typically also include other compounding additives. These additives include, without limitation, accelerators, oils, waxes, scorch inhibiting agents, and processing aids. As known in the art, vulcanizable compositions of matter containing synthetic rubbers typically include antidegradants, processing oils, zinc oxide, optional tackifying resins, optional reinforcing resins, optional fatty acids, optional peptizers, and optional scorch inhibiting agents.

These vulcanizable compositions are compounded or blended by using mixing equipment and procedures conventually employed in the art. Preferably, an initial masterbatch is prepared that includes the rubber component and the reinforcing fillers, as well as other optional additives such as processing oil and antioxidants. According to this invention, it is preferred to add the functionalized polyolefin copolymers during preparation of the initial masterbatch. Once this initial masterbatch is prepared, the vulcanizing agents are blended into the composition. This vulcanizable composition of matter can then be processed according to ordinary tire manufacturing techniques. Likewise, the tires are ultimately fabricated by using standard rubber curing techniques. For further explanation of rubber compounding and the additives conventionally employed, one can refer to *The Compounding and Vulcanization of Rubber,* by Stevens in RUBBER TECHNOLOGY SECOND EDITION (1973 Van Nostrand Reihold Company), which is incorporated herein by reference.

The elastomers that are typically employed within vulcanizable compositions of matter that are useful for making tires include both natural and synthetic elastomers rubbers. For example, these elastomers include, without limitation, natural rubber, synthetic polyisoprene rubber, styrene/butadiene rubber (SBR), polybutadiene, butyl rubber, neoprene, ethylene/propylene rubber, ethylene/propylene/diene rubber (EPDM), acrylonitrile/butadiene rubber (NBR), silicone rubber, the fluoroelastomer, ethylene acrylic rubber, ethylene vinyl acetate copolymers (EVA) epichlorohydrin rubbers, chlorinated polyethylene rubber, chlorosulfonated polyethylene rubbers, hydrogenated nitrile rubber, tetrafluoroethylene/propylene rubber and the like. As used herein, the term elastomer or rubber will refer to a blend of synthetic and natural rubber, a blend of various synthetic rubbers, or simply one type of elastomer or rubber. Also, the elastomers that are useful in practicing this invention include any of the various functionalized elastomers that are conventionally employed in the art of making tires. Inasmuch as the preferred embodiments of the present invention are directed toward off-road and heavy truck tires, it is preferred to employ natural rubber and SBR with natural rubber being most preferred.

The reinforcing agents, such as carbon black or silica, typically are employed in amounts ranging from about 1 to about 100 parts by weight per 100 parts by weight rubber (phr), with about 20 to about 80 parts by weight (phr) being preferred, and with about 40 to about 80 parts by weight (phr) being most preferred. The carbon blacks may include any of the commonly available, commercially-produced carbon blacks, but those having a surface area (EMSA) of at least 20 $m^2/g$ and more preferably at least 35 $m^2/g$ up to 200 $m^2/g$ or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks that may be utilized include acetylene blacks. Mixtures of two or more of the above blacks can be used in preparing the carbon black products of the invention. Typical values for surface areas of usable carbon blacks are summarized in the following table.

| CARBON BLACKS | |
|---|---|
| ASTM Designation (D-1765-82a) | Surface Area ($m^2/g$) (D-3765) |
| N-110 | 126 |
| N-220 | 111 |
| N-339 | 95 |
| N-330 | 83 |
| N-550 | 42 |
| N-660 | 35 |

The carbon blacks utilized in the preparation of the rubber compounds used may be in pelletized form or in unpelletized flocculent mass. Preferably, for more uniform mixing, unpelletized carbon black is preferred.

With respect to the silica fillers, the vulcanizable compositions of the present invention may preferably be reinforced with amorphous silica (silicon dioxide). Silicas are generally referred to as wet-process, hydrated silicas because they are produced by a chemical reaction in water, from which they are precipitated as ultrafine, spherical particles. These particles strongly associate into aggregates that in turn combine less strongly into agglomerates. The surface area, as measured by the BET method, gives the best measure of the reinforcing character of different silicas. Useful silicas preferably have a surface area of about 32 to about 400 $m^2/g$, with the range of about 100 to about 250 $m^2/g$ being preferred, and the range of about 150 to about 220 $m^2/g$ being most preferred. The pH of the silica filler is generally about 5.5 to about 7 or slightly over, preferably about 5.5 to about 6.8.

When employed, silica can be used in the amount of about 1 part to about 100 parts by weight per 100 parts of polymer (phr), preferably in an amount from about 5 to about 80 phr. The useful upper range is limited by the high viscosity imparted by fillers of this type. Usually, both carbon black and silica are employed in combination as the reinforcing filler. When both are used, they can be used in a carbon black:silica ratio of from about 10:1 to about 1:2. Some of the commercially available silicas that may be used include: Hi-Sil® 215, Hi-Sil® 233, and Hi-Sil® 190, produced by PPG Industries. Also, a number of useful commercial grades of different silicas are available from a number of sources including Rhone Poulenc. Typically, a coupling agent is added when silica is used as a reinforcing filler. One coupling agent that is conventionally used is bis-[3 (triethoxysilyl) propyl]-tetrasulfide, which is commercially available from Degussa, Inc. of New York, N.Y. under the tradename SI69.

The reinforced rubber compounds can be cured in a conventional manner with known vulcanizing agents at about 0.5 to about 4 phr. For example, sulfur or peroxide-based curing systems may be employed. For a general disclosure of suitable vulcanizing agents one can refer to Kirk-Othmer, ENCYCLOPEDIA OF CHEMICAL TECHNOLOGY, $3^{rd}$ Edition, Wiley Interscience, N.Y. 1982, Vol. 20, pp. 365–468, particularly VULCANIZATION AGENTS AND AUXILIARY MATERIALS pp. 390–402, or VULCANIZATION by A.Y. Coran, ENCYCLOPEDIA OF POLYMER SCIENCE AND ENGINEERING, $2^{nd}$ Edition, John Wiley & Sons, Inc., 1989; both of which are incorporated herein by reference. Vulcanizing agents may be used alone or in combination. This invention does not affect cure times, and thus the polymers can be cured for a conventional amount of time. Cured or crosslinked polymers will be referred to as vulcanizates for purposes of this disclosure.

In addition to the advantageous feature of the present invention noted above, the cost of producing tires, especially off-road tires, can be significantly reduced by employing the formulations according to the present invention. Because polyolefin copolymers can be added to tire formulations or recipes without deleteriously impacting the ultimate properties of the tires, the use of polyolefin copolymers yields significant cost savings.

In order to demonstrate the practice of the present invention, the following examples have been prepared and tested as described in the Experimental Section disclosed hereinbelow. The examples should not, however, be viewed as limiting the scope of the invention. The claims will serve to define the invention.

GENERAL EXPERIMENTATION

Eight rubber stocks were prepared according to the recipe set forth in Table I.

TABLE I

| Rubber Stock Recipe | |
|---|---|
| Natural Rubber | 100 |
| Carbon Black (SAF) | 45 |
| Zinc Oxide | 3.5 |
| Retarder | 0.1 |
| Antioxidants | 2.3 |
| Masterbatch | 150.6 |
| Sulfur | 1.3 |
| Accelerator | 1.25 |
| Hardened Fatty Acid | 2 |
| Total | 155.15 |
| Polyolefin Additive (optional) | 20 |
| Total | 175.15 |

Except for the polyolefin additive, each of the ingredients used in the recipe of Table I are conventionally employed in the art and are commercially available from a number of sources. For purposes of this experiment, the same ingredients were used for each of the stocks prepared except for the variation in polyolefin copolymer additive, as will be described hereinbelow.

Standard compounding techniques were employed to prepare a masterbatch that included the natural rubber, polyolefin copolymer additive (where applicable), carbon black, zinc oxide, retardor, and antioxidants. Specifically, these ingredients were mixed within an internal mixer for about five minutes at about 50 rpm. The initial temperature was about 110° C., and the drop temperature that was achieved was about 180° C. The masterbatch was allowed to cool, and the hardened fatty acid, sulfur, and accelerator were added to the masterbatch. Mixing was continued for about 30 seconds at about 50 rpm. The final drop temperature that was achieved was about 110° C.

As noted above, a polyolefin additive was optionally added to the stocks. Specifically, Stocks 3, 4, 7, and 8, which represent embodiments of this invention, included a propylene-ethylenecopolymer. Stocks 2 and 6 included a polypropylene homopolymer additive, and Stocks 1 and 5 did not include any polyolefin additive. Table II more specifically sets forth the polyolefin copolymer additive that was employed in each stock along with the molecular weight ($M_w$), melt index, and ethylene content of each additive.

TABLE II

| | Polyolefin Additive | | | |
|---|---|---|---|---|
| Stock | Type | Molecular Weight ($M_w$) | Melt Index | Ethylene Content (%) |
| 1 | none | — | — | — |
| 2 | homopolymer | 250,000 | 12 | — |
| 3 | copolymer | 120,000 | 12 | 16 |
| 4 | copolymer | 133,000 | 12 | 6 |
| 5 | none | — | — | — |
| 6 | homopolymer | 106,000 | 33 | — |
| 7 | copolymer | 119,000 | 35 | 12 |
| 8 | copolymer | 1000,000 | 35 | 7 |

The melt index of each polyolefin was determined according to ASTM 1238 at 230° C. and a load of 2.16 Kg. Molecular weight was determined according to standard GPC analysis with polystyrene as a standard. Each polyolefin was obtained from the following commercial sources: Stock No. 2 from Aldrich Chemical Company; Stock No. 3 from Aristech Chemical Corporation under the tradename TI4119GN; Stock No. 4 from Aristech under the tradename TI15150M; Stock No. 6 from Aristech under the tradename FP300F; Stock No. 7 from Aristech under the tradename TI4330F; and Stock No. 8 from Aristech under the tradename TI5350M.

Each rubber stock that was prepared was sheeted and molded at 145° C. for about 33 minutes. The tensile mechanical properties were measured by using the procedure described in ASTM-D 412 at 100° C. The tensile test specimens were round rings with a dimension of 0.05 inches in width and 0.075 inches in thickness. The rings were notched at two places on the inner circumference of the ring at equidistant locations. A specific gauge length of 1.0 inch was used for the tensile tests. Also, the tear strengths of the vulcanized stocks were measured by using the procedure set forth in ASTM-D 624 at 100° C. The test specimens employed were round rings nicked at two points on their inside circumference, with a dimension of 0.25 inches in width, 0.10 inches in thickness, and 44 mm and 57.5 mm in inside and outside diameters, respectively. These specimens were tested at a specific gauge length of 1.750 inches. Still further, the resulting vulcanizates were tested for hysteresis loss as measured by tanδ data. The tanδ data was obtained by using a Rheometrics Dynamic Analyzer and the Dynamic-Temperature-Step-Test procedure was followed. The test specimens used for this sweep test were rectangular slabs with dimensions of 0.5 inches in width, 1.5 inches in length, and 0.1 inches in thickness. The following test conditions were employed: frequency 31.4 rad/sec, strain of 0.2 percent for the temperature range from −70° C. to −10° C., and a strain of 2 percent for the temperature range from −10° C. to 100° C. Still further, each vulcanizate was tested for wear resistance. Specifically, wear resistance was determined by using the Lambourn Test. The results of this test are reported as an abrasion index that is obtained from the ratio of the weight loss of the control sample to that of the tested sample. The specimens used for the Lambourn Test are circular donuts that have an inside diameter of about 0.9 inches, an outside diameter of about 1.9 inches, and are about 0.195 inches thick. According to the Lambourn Test, the specimens are placed on an axil and run at a slip ratio of 65 percent against a driven abrasive surface. The data obtained from all of the foregoing tests are reported in Table III.

TABLE III

| | Stock | | | | | | | |
|---|---|---|---|---|---|---|---|---|
| Properties | 1 | 2 | 3 | 4 | 5 | 6 | 7 | 8 |
| Tensile Strength at Break @ (100° C.)(psi) | 2921 | 2390 | 2842 | 2760 | 3096 | 2706 | 2916 | 2826 |
| Tensile Toughness @ 100° C. | 8030 | 6770 | 8393 | 8220 | 8092 | 7344 | 8482 | 8099 |
| Maximum Elongation @ 100° C. (%) | 682 | 550 | 618 | 605 | 658 | 544 | 635 | 609 |
| 50% Modulus @ 100° C. (psi) | 124 | 242 | 217 | 232 | 135 | 251 | 206 | 213 |
| 300% Modulus @ 100° C. (psi) | 841 | 1345 | 1295 | 1338 | 904 | 1462 | 1187 | 1260 |
| Tear Strength @ 100° C. (lb./in.) | 502 | 630 | 640 | 655 | 554 | 595 | 622 | 614 |
| Travel at Tear (%) | 602 | 501 | 602 | 542 | 642 | 476 | 622 | 557 |
| Abrasion Index | 100 | 97 | 105 | 105 | 100 | 91 | 98 | 98 |
| tanδ @ 100° C. | .1315 | .1713 | .17 | .1663 | .1409 | .1654 | .1684 | .1649 |
| Thermal Index 1000 | 1.06 | 0.71 | 0.78 | 0.72 | 1.04 | 0.66 | 0.82 | 0.81 |

In general, the tear strengths of the stocks that included polyolefins increased from about 15 to about 30 percent compared to those stocks that did not include a polyolefin. But, the mechanical strengths of the stocks containing polypropylene homopolymer, i.e., Stocks 2 and 6, degraded from about 15 to about 20 percent. On the other hand, Stocks 3 and 7, which contained propylene-ethylene copolymers, only marginally deviated from the tensile properties of the stocks that did not contain polyolefin. Likewise, Stocks 4 and 8, which also included propylene-ethylene copolymers, only deviated up to about 10 percent from those stocks that did not contain polyolefin. Also, the presence of the propylene-ethylene copolymer greatly reduces the negative impact that the presence of a polyolefin has on the elongation properties of the vulcanizates.

It is also noted that the presence of the polyolefin increases the hysteresis loss at 100° C. for all of the vulcanizates that contained a polyolefin. But, this shortcoming is compensated by the increased modulus observed when the polyolefin is present. This can be more clearly understood with reference to the thermal index 1000, which is the ratio of the tanδ at 100° C. to the 50 percent modulus at 100° C. As those skilled in the art will appreciate, this measurement is used as a measure of the possible heat generation under cyclic loading. A lower thermal indice is indicative of a lower possible heat generation under dynamic loading. As for the abrasion index reported for the Lambourn Test, it is noted that samples with a higher abrasion indice have better wear resistance properties. As the vulcanizate becomes stiffer, less deformation occurs under cyclic loading.

Each of the stocks were then thermally aged at 100° C. for 24 hours. The stocks were then tested for tensile mechanical properties according to ASTM-D 412 at 100° C. as described above. The vulcanized stocks were also subsequently tested for wear resistance according to the Lambourn Test, as also discussed above. Table IV sets forth the data obtained from this testing.

TABLE IV

| Properties | Stock | | | | | | | |
|---|---|---|---|---|---|---|---|---|
| | 1 | 2 | 3 | 4 | 5 | 6 | 7 | 8 |
| Tensile Strength at Break @ (100° C.)(psi) | 2662 | 2109 | 2454 | 2206 | 2667 | 2018 | 2161 | 2148 |
| Tensile Toughness @ 100° C. | 6894 | 5124 | 6427 | 5546 | 6820 | 4366 | 5685 | 5671 |
| Maximum Elongation @ 100° C. (%) | 600 | 447 | 512 | 476 | 594 | 407 | 530 | 519 |
| 50% Modulus @ 100° C. (psi) | 137 | 300 | 256 | 279 | 144 | 279 | 212 | 203 |
| 300% Modulus @ 100° C. (psi) | 1049 | 1519 | 1480 | 1477 | 1069 | 1554 | 1215 | 1279 |
| Abrasion Index | 100 | 93 | 101 | 97 | 100 | 95 | 99 | 102 |

It is noted that the tensile properties of those stocks that contained the polypropylene homopolymer degraded up to about 35 percent after thermal aging. As with the data obtained before thermal aging, the presence of the propylene-ethylene copolymer did not deleteriously impact the tensile properties of the vulcanizate to the same magnitude that the homopolymer did. Indeed, the tensile properties of the aged vulcanizates containing propylene-ethylene copolymers only degraded from about 10 up to about 20 percent compared to the 35 percent degradation where the polypropylene homopolymer was employed.

Based upon the foregoing disclosure, it should now be apparent that the use of the polyolefin copolymers described herein will carry out the objects set forth hereinabove. It is, therefore, to be understood that any variations evident fall within the scope of the claimed invention and thus, the selection of specific component elements can be determined without departing from the spirit of the invention herein disclosed and described. For example, the vulcanizable compositions defined herein are not necessarily limited to those used to fabricate off-road tires. Thus, the scope of the invention shall include all modifications and variations that may fall within the scope of the attached claims.

What is claimed is:

1. A tire including at least one tire component comprising:
    a vulcanized rubber; and
    up to about 35 parts by weight of polyolefin copolymer per one hundred parts by weight rubber, where said vulcanized rubber forms a three-dimensional thermoset structure and said polyolefin copolymer is dispersed therein.

2. A tire, as set forth in claim 1, where said polyolefin copolymer includes random, block, or statistical propylene-ethylene copolymers or mixtures thereof.

3. A tire, as set froth in claim 2, where said polyolefin copolymer includes from about 1 to about 30 percent by weight ethylene monomeric units.

4. A tire, as set forth in claim 3, where the tire component further comprises a filler.

5. A tire, as set forth in claim 1, where the tire component includes from about 5 to about 30 parts by weight of said polyolefin copolymer per one hundred parts by weight rubber.

6. A tire, as set forth in claim 1, where said rubber is styrene-butadiene rubber, butyl rubber, polybutadiene rubber, polyisoprene rubber or mixtures thereof.

7. The tire of claim 1, where the tire component is a tire tread or tire side wall.

8. The tire of claim 4, where the filler comprises silica.

9. A tire component prepared by a process comprising the steps of:
    preparing a vulcanizable composition of matter by compounding or blending a rubber, a filler, and a polyolefin copolymer; and
    vulcanizing the rubber with at least one vulcanizing agent to form a three-dimensional thermoset structure with the polyolefin copolymer filler dispersed therein.

10. A tire, as set forth in claim 9, where the polyolefin copolymer is a random, block, or statistical ethylene-propylene copolymer.

11. A tire component, as set forth in claim 10, where the vulcanizable composition of matter includes up to about 35 parts by weight polyolefin per one hundred parts by weight rubber.

12. A tire component, as set froth in claim 11, wherein the vulcanizable composition of matter includes up to about 100 parts by weight of filler per 100 parts by weight rubber.

13. A tire component, as set froth in claim 9, where the rubber is styrene-butadiene rubber, butyl rubber, polybutadiene rubber, polyisoprene rubber or mixtures thereof.

14. A tire component, as set forth in claim 9, where the at least one vulcanizing agent includes sulfur.

15. The tire component of claim 9, where the tire component is a tire tread or tire side wall.

16. The tire component of claim 12, where the filler comprises silica.

17. A tire component comprising:
    a vulcanized rubber;
    from about 1 to about 100 parts by weight per 100 parts by weight rubber of a filler including carbon black, silica, or a mixture thereof; and
    from about 5 to about 30 parts by weight per 100 parts by weight rubber of a polyolefin copolymer, where the vulcanized rubber, the filler, and the polyolefin copolymer are fabricated into a tire component, which is a three-dimensional rhermoset rubber article.

18. The tire of claim 17, where the polyolefin copolymer includes a copolymer of propylene and ethylene, and where the copolymer includes from about 5 to about 25 percent by weight units deriving form ethylene.

19. The tire of claim 17, where the tire component is a tire tread.

20. The tire of claim 17, where the vulcanized rubber is crosslinked by using a sulfur-containing curative.

* * * * *